(12) United States Patent
Suder et al.

(10) Patent No.: US 7,826,440 B1
(45) Date of Patent: *Nov. 2, 2010

(54) QUALITY OF SERVICE IN A REMOTE TELEPHONE

(75) Inventors: Eric G. Suder, Plano, TX (US); Harold E. A. Hansen, II, Plano, TX (US)

(73) Assignee: Estech Systems, Inc., Plano, TX (US)

( * ) Notice: Subject to any disclaimer, the term of this patent is extended or adjusted under 35 U.S.C. 154(b) by 2311 days.

This patent is subject to a terminal disclaimer.

(21) Appl. No.: 10/072,343

(22) Filed: Feb. 7, 2002

Related U.S. Application Data

(63) Continuation-in-part of application No. 09/775,018, filed on Feb. 1, 2001.

(51) Int. Cl.
*H04L 12/66* (2006.01)
*G01R 31/08* (2006.01)
*H04J 1/02* (2006.01)

(52) U.S. Cl. .................. 370/352; 370/493; 370/229

(58) Field of Classification Search .............. 370/230, 370/352, 356, 400, 401, 395.21, 468, 412, 370/389, 235, 229, 236, 241, 251, 253, 254, 370/493, 494, 495; 709/223, 225, 226; 455/450, 455/453, 452; 379/88.17, 265.06, 100.05
See application file for complete search history.

(56) References Cited

U.S. PATENT DOCUMENTS

| | | | | |
|---|---|---|---|---|
| 5,751,791 A | * | 5/1998 | Chen et al. .............. | 379/88.13 |
| 5,815,503 A | * | 9/1998 | Li .............................. | 370/471 |
| 5,878,120 A | * | 3/1999 | O'Mahony ............... | 379/93.09 |
| 6,330,451 B1 | * | 12/2001 | Sen et al. ................. | 455/452.2 |
| 6,600,737 B1 | * | 7/2003 | Lai et al. .................... | 370/352 |
| 6,650,619 B1 | * | 11/2003 | Schuster et al. ............ | 370/230 |
| 6,683,889 B1 | * | 1/2004 | Shaffer et al. .............. | 370/516 |
| 6,856,613 B1 | * | 2/2005 | Murphy ..................... | 370/352 |
| 6,862,298 B1 | * | 3/2005 | Smith et al. ................ | 370/516 |
| 6,934,258 B1 | * | 8/2005 | Smith et al. ................ | 370/238 |
| 6,947,385 B2 | * | 9/2005 | Havens ...................... | 370/236 |
| 6,980,569 B1 | * | 12/2005 | Beyda et al. ............... | 370/516 |
| 7,054,327 B2 | * | 5/2006 | Hagirahim et al. ......... | 370/410 |
| 7,161,905 B1 | * | 1/2007 | Hahn et al. ................ | 370/231 |
| 7,203,186 B1 | * | 4/2007 | Fuller et al. ................ | 370/352 |
| 7,269,159 B1 | * | 9/2007 | Lai ............................ | 370/352 |

* cited by examiner

*Primary Examiner*—Hanh Nguyen
(74) *Attorney, Agent, or Firm*—Kelly Kordzik; Matheson Keys Garsson & Kordzik PLLC

(57) ABSTRACT

An information handling system comprises a TCP/IP network connected via a modem to an IP telephony device that is then coupled to a network device. Data sent from the network device is addressed for transmission through the IP telephony device to the TCP/IP network. The IP telephony device monitors when an amount of data being received over the network falls below a predetermined threshold. If this occurs, the IP telephony device will throttle data being received by the IP telephony device from the connected network device.

54 Claims, 8 Drawing Sheets

QUALITY OF SERVICE IN A REMOTE TELEPHONE

CROSS-REFERENCE TO RELATED APPLICATION

This application is a continuation-in-part of U.S. application Ser. No. 09/775,018, which is hereby incorporated by reference herein.

TECHNICAL FIELD

The present invention relates in general to information processing systems, and in particular, to the use of Voice over IP technology to transmit voice conversations.

BACKGROUND INFORMATION

Voice over IP ("VoIP") is a relatively recent development that is utilized to transmit voice conversations over a data network using the Internet Protocol ("IP"). Internet Protocol is a part of the TCP/IP family of protocols described in software that tracks the Internet address of nodes, routes outgoing messages, and recognizes incoming messages. Such a data network may be the Internet or a corporate intranet, or any TCP/IP network. There are several potential benefits for moving voice over a data network using IP. First, there is a savings in money compared to the need to use traditional tolled telecommunications networks. Additionally, Voice over IP enables the management of voice and data over a single network. And, with the use of IP phones, moves, adds and changes are easier and less expensive to implement. Moreover, additional and integrated new services, including integrated messaging, bandwidth on demand, voice e-mails, the development of "voice portals" on the Web, simplified setting up and tearing down, and transferring of phone calls are capable.

Using Voice over IP technology, phone systems can communicate with each other over existing TCP/IP data networks typically present between remote offices. This feature alone can eliminate the need for expensive, dedicated circuits between facilities. The shared bandwidth can also be used for voice calls and data communication simultaneously; no bandwidth is dedicated to one or the other.

Another advantage of a Voice over IP system is the ability to implement a phone system over an existing data network that is already connecting workstations within a local area network (LAN) and even over a wide area network (WAN). Such networks utilize frame packets for transmitting information. Voice over IP can utilize such packet switching capabilities to connect IP phones onto the LAN and/or WAN. However, the implementation of Voice over IP onto a network has proven to have some difficulties. Data networks were originally designed to allow for latency (delays) in the delivery of packets between sources and destinations. If a packet became lost, then the network would go through a re-send protocol to have the packet sent again from the source to the destination, and the data then reassembled at the destination end. With voice (or for that matter, video or any other real-time application), such delays present problems. Real-time applications cannot tolerate significant delays or they no longer become real-time applications. Such quality of service ("QOS") concerns are especially amplified when attempting to implement Voice over IP onto a data network, since it can be affected by bursts of data transfers among the workstations and servers, etc. For example, a large print job or a file access can significantly occupy the bandwidth on such a network, thus greatly degrading the ability to transmit any real-time information during that data burst. This problem worsens as more and more Voice over IP telephones are added to the network.

FIG. 1 illustrates a typical configuration where a remote IP telephone is connected to an isolated network, consisting of a NAT (Network Address Translation) router, the IP telephone, and a personal computer (PC). The other side of the NAT router is typically connected to a WAN such as xDSL, cable or ISDN, through the use of a modem. The data bandwidth of a WAN connection is usually very limited compared to that of a LAN. This limited bandwidth is shared among all devices connected to the NAT router. A problem arises when the remote IP telephone is in use, and the workstation (PC) attempts to access a large amount of data. During this condition, it is possible for the workstation to essentially "starve" the IP telephone of bandwidth, causing the IP telephone to malfunction (e.g., broken speech, etc.). Because it is preferred that the IP telephone communicate its content uninterrupted, there is a need in the art to provide the IP telephone with guaranteed priority over workstation data.

SUMMARY OF THE INVENTION

The present invention addresses the foregoing need by providing an information processing system whereby an IP telephony system is designed to share a network with data devices communicating with a network operating system. In the present invention, a workstation is connected to the network through an IP telephone's layer 2 switch. A quality of service algorithm is then performed in the remote IP telephone by monitoring the receive jitter buffers and/or inter-packet timing. When the algorithm determines that normal voice operation is in danger of being interrupted, the remote IP telephone starts directly throttling data to the workstation. This throttling is accomplished by discarding packets to/from the workstation at a rate determined by the algorithm. As the workstation's traffic starts to decrease, the available bandwidth for the IP telephone increases, guaranteeing voice quality of service.

An advantage of the present invention is that it alleviates the problem of simultaneous, uncontrolled access of both an IP telephone and a remote workstation through a single WAN connection.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
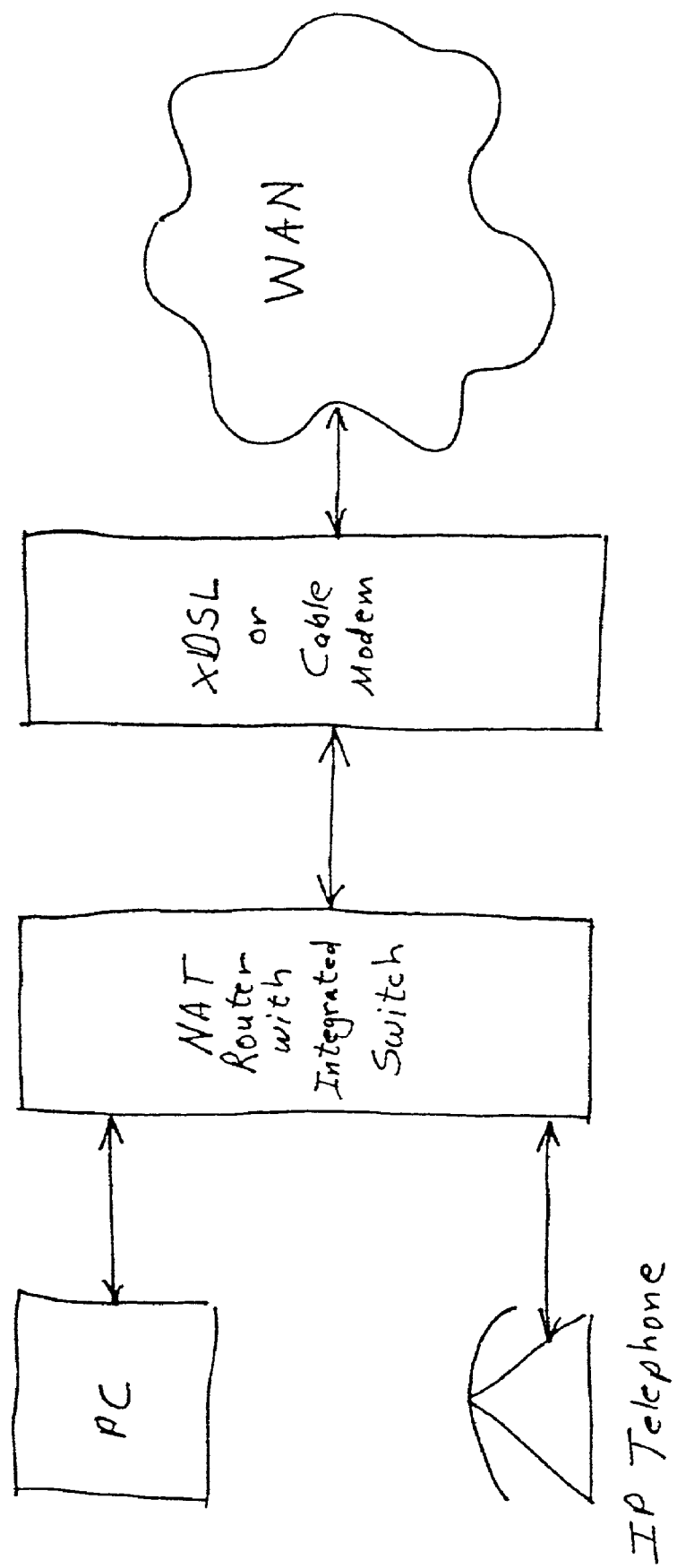
FIG. 1 illustrates an information processing system where data congestion affects the quality of service in an IP telephone.

In the following description, numerous specific details are set forth such as specific network configurations, network devices, types of multimedia traffic, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Though the present invention is described with respect to use of Internet Protocol ("IP"), the present invention is not limited to use with any particular data transfer protocol. Furthermore, herein, the term "workstation" can refer to any network device that can either receive data from a network, transmit data to a network, or both.

Figure 3:
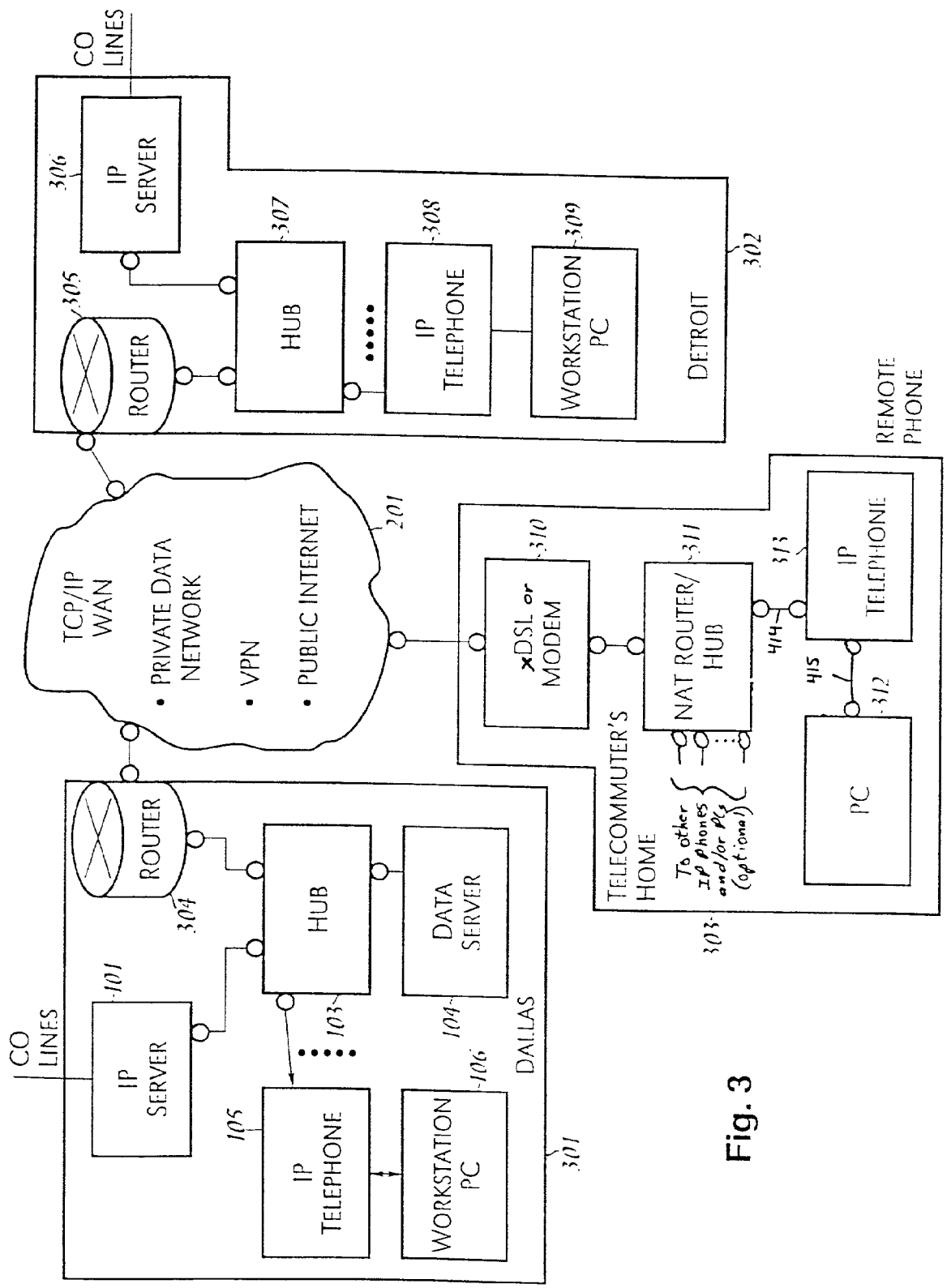
FIG. 3 illustrates an embodiment of a wide area network configuration of the present invention.

An IP telephone, or telephony device, as used herein, is any apparatus, device, system, etc., that can communicate multimedia traffic using IP telephony technology. "IP telephony" is defined within Newton's Telecom Dictionary, Harry Newton, Seventeenth Edition, page 369, which publication is hereby incorporated by reference FIG. 3 illustrates one embodiment of the present invention over a WAN 201. Note that such a WAN may implement the TCP/IP protocol, and could be a public WAN, such as the Internet, a private data network, an intranet, or a Virtual Private Network ("VPN"). Information, or data, on the network includes both the voice and data information, and any other multimedia traffic.

FIG. 3 illustrates an exemplary system where WAN 201 couples an information processing system 301 in Dallas, Tex. to another information processing system 302 in Detroit, Mich., while also permitting a remote system 303 to couple to both systems 301 and 302 through WAN 201, such as from a telecommuter's home.

System 301 illustrates a LAN with a workstation PC 106, network hub 103 and server 104 coupled to each other in a typical LAN configuration where data is communicated between the workstation 106 and the server 104. Naturally, other workstations and servers could also be coupled to the LAN through hub 103, including the use of additional hubs. IP multimedia server 101 is coupled to hub 103, and an IP telephony device 105 is connected between the workstation 106 and the hub 103. The IP multimedia server 101 is coupled to a central office ("CO") 102 so that telephony device 105 can communicate to other telecommunications networks, such as the public switched telephone network ("PSTN"). Additional IP telephony devices 105 can be coupled to hub 103, including having workstations coupled to hub 103 through such IP telephony devices. Further details on multimedia server 101 and IP telephony device 105 are described within U.S. patent application Ser. No. 09/775,018. System 301 is coupled to WAN 201 through router 304.

System 302 is similar to system 301 with the exception that a data server is not implemented within system 302. Router 305 is similar to router 304, multimedia server 306 is similar to multimedia server 101, hub 307 is similar to hub 103, IP telephony device 308 is similar to IP telephony device 105, and workstation 309 is similar to workstation 106.

Remote system 303 is coupled to WAN 201 using a modem 310, such as an xDSL (digital subscriber line) modem or cable modem. A NAT (Network Address Translation) router/hub 311 then couples a workstation PC 312 and an IP telephony device 313 to the modem 310. The workstation PC 312 is connected behind the layer 2 switching circuitry within the IP telephone 313. The quality of service algorithm of the present invention as described in further detail below is performed in the remote IP telephone 313 by monitoring the receive jitter buffers (described below). When the algorithm determines that normal voice operation is in danger of being interrupted, the remote IP telephone 313 directly throttles data to the workstation 312. This throttling is accomplished by discarding packets to/from the workstation 312 at a rate determined by the algorithm in the IP telephone 313. As the traffic within the workstation 312 starts to decrease, the available bandwidth for the IP telephone 313 increases, improving the voice quality of service. Note that there may be a feedback path in the algorithm that dynamically adjusts the throttling mechanism based on jitter buffer conditions.

Other IP telephones and/or workstation PC's may optionally be connected to the NAT router/hub 311 in a similar fashion. It should be also noted that embodiments of the present invention also include other such remote phone systems, such as system 303, coupled to WAN 201, operating in a similar fashion as system 303. Not only can data be transferred across WAN 201 between systems 301-303, but also any one of telephony devices 105, 308 and 313 can communicate with each other and with the PSTN (not shown) over CO lines coupled to either of systems 301 or 302.

Figure 2:
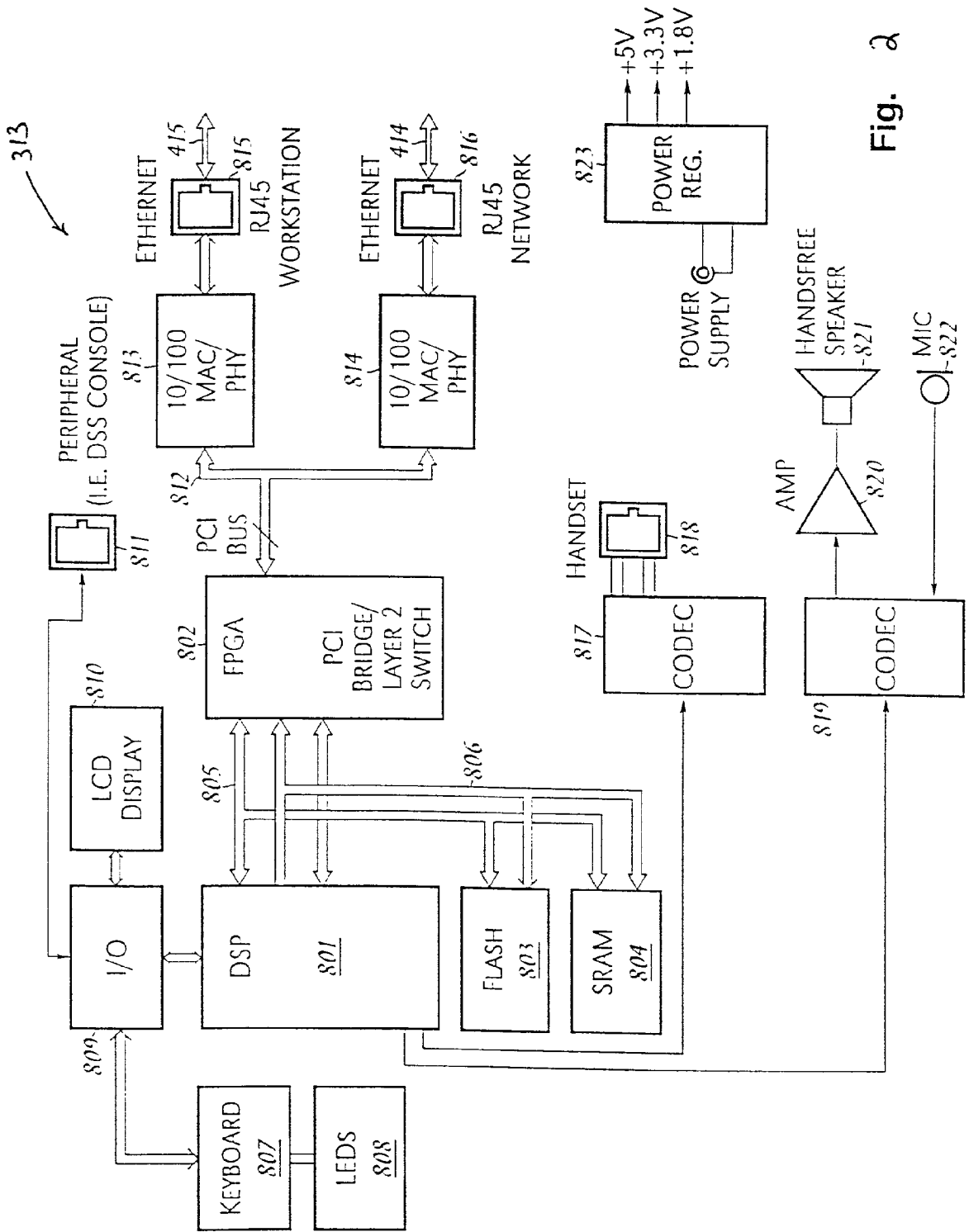
FIG. 2 illustrates a block diagram of a telephony device configured in accordance with the present invention.

Referring to FIG. 2, there is illustrated a block diagram of further detail of IP telephony device 313. IP telephony device 313 may be a DSP based telephone instrument. Telephony device 313 communicates via the UDP/IP Protocol. Physical connection to the LAN is via an Ethernet 10/100 Base T interface. IP telephony device 313 contains the ability to perform layer 2 switching between two ports in the telephony device 313 for total control over voice versus data quality of service in accordance with the present invention. Speech samples are digitized, stored in 16 millisecond long packets and transmitted to the router 311 via the UDP/IP Protocol. As packets are received, they are triple-buffered to compensate for jitter before playback.

Connection 415 from workstation 312 is received by Ethernet RJ-45 connector 815, which is coupled to MAC/PHY device 813. Connection 414 between router 311 and telephony device 313 is connected to RJ-45 connector 816 which is coupled to MAC/PHY device 814. Devices 813 and 814 are coupled by PCI bus 812 to FPGA/PCI bridge 802.

DSP 801 may be a Texas Instruments Model 5402 DSP; DSP 801 can be the only processor implemented within telephony device 313. DSP 801 performs typical DSP audio algorithms such as tone generation, gain, speaker phone algorithms, and energy detection. In addition, DSP 801 acts as a standard control processor performing such tasks as scanning the keyboard 807, lighting LED lamps 808, displaying LCD messages on LCD 810, performing UDP/IP stack functions, communicating with devices 813, 814 via the PCI bus 812, and executing algorithm such as those implemented in the present invention and described below. Note that DSP 801 communicates with keyboard 807, LEDs 808, LCD display 810, and peripheral connection 811 by I/O device 809 in a typical manner. Peripheral connection 811 permits a coupling of DSP 801 to a DSS console. A DSS console is a stand-alone device, which connects to the IP telephony device 313 to provide 64 individual LED lamps and keys. The lamps can be programmed by the user to monitor the status of individual stations, trunks or features. Pressing the key will access the associated function. Each telephony device in the system can connect to a DSS console. The DSS console communicates with the IP telephony device 313 via a 9600 baud serial communication link. The IP telephony device 313 does not contain a serial UART device, so the serial data protocol is controlled by software running in DSP 801. Physical connection between the telephony device and DSS console may be via a standard two pair modular line cord.

DSP 801 is coupled to an external FLASH memory 803 and a fast SRAM 804, and FPGA 802 via buses 805 and 806.

CODEC 817 and CODEC 819 perform analog to digital and digital to analog conversion of speech signals. CODEC 817 is connected to the handsets, speaker and microphone elements (not shown) via connector 818, while CODEC 819 is connected to the hands-free speaker 821 through amplifier 820, and to the hands-free microphone 822. Separating the functionality in this way permits the IP telephony device 313 to send tones or voice to one speaker while allowing a normal conversation over the other.

FPGA/PCI bridge 802 performs the functions required to connect telephone 313 to the 10/100 Base T Ethernet devices 813, 814. Since devices 813, 814 are designed to communicate via a standard PCI bus 812, the FPGA 802 implements a minimal PCI bus implementation. In addition, the FPGA 802 implements I/O latches and buffers as required.

Devices 813, 814 perform the Media Access Control and the PHYSICAL layer functions. Devices 813, 814 communicate to DSP 801 via a standard PCI bus 812, and communicate to the LAN via post-transformer coupled RJ-45 connections 815, 816. Devices 813, 814 can contain FIFOs to minimize lost packets during traffic peaks. Per the PCI bus mastering specification, devices 813, 814 take control of the buses 805, 806 and direct memory access (DMA) data directly to SRAM 804. Conversely, DSP 801 writes data to be sent into the SRAM 804 and the devices 813, 814 DMA the data via the PCI bus 812 to the LAN.

Figure 4:
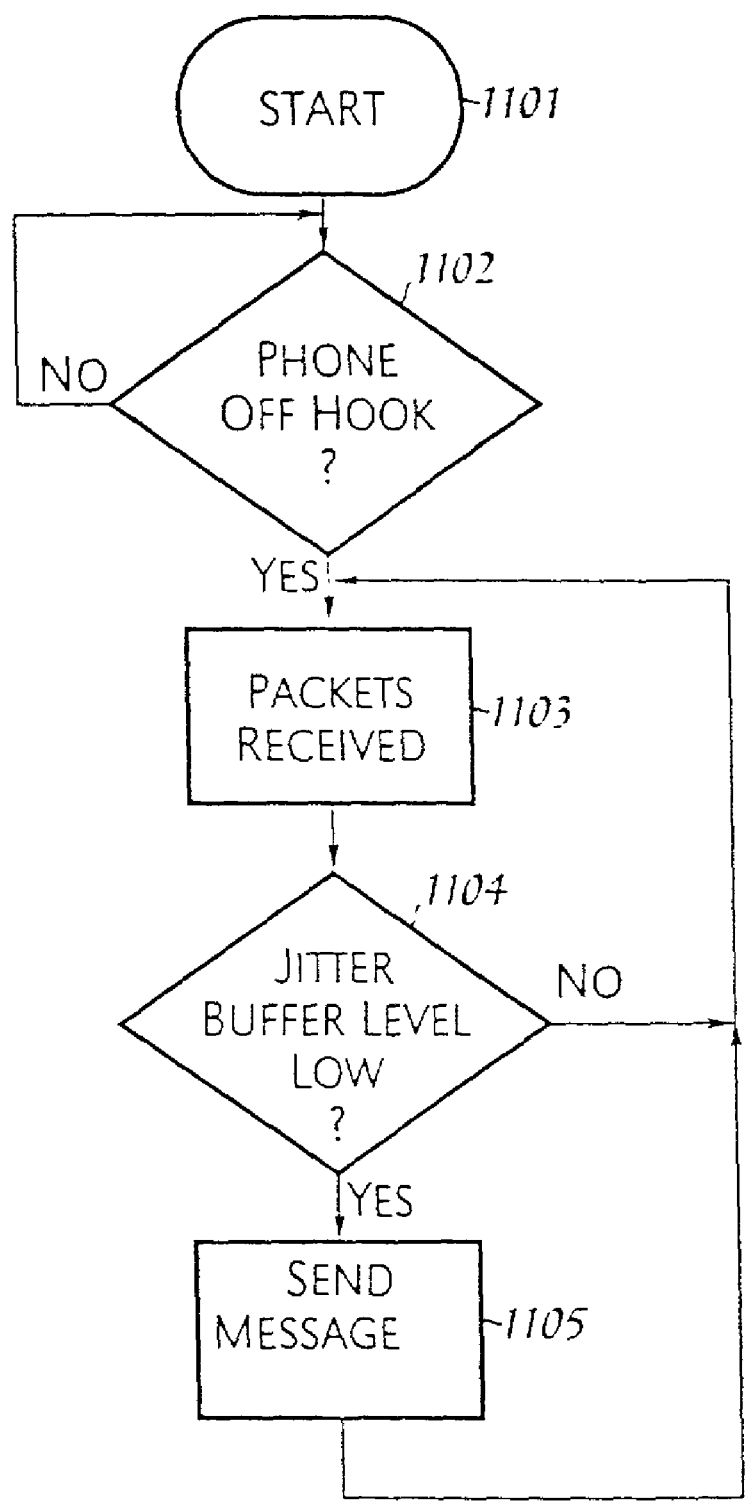
FIGS. 4, 5, 6A and 6B illustrate flow diagrams configured in accordance with the present invention.

Referring to FIG. 4, there is illustrated a process implemented within an IP telephony device, such as telephony device 313, which process can be run within DSP 801. The process detects network congestion and notifies a throttling process described below via a congestion message. The process begins in step 1101, and proceeds to step 1102 to determine whether the IP telephony device 313 is off the hook. If it is, the process proceeds to step 1103 where audio data packets are received by telephony device 313 from the NAT router 311. The audio (voice) data packets being received from NAT router 311 have been sent via WAN 201, and are packets containing audio information communicated between telephony device 105 and some other telecommunications device coupled to the system (e.g., phones 105, 308). As these packets are received, they are saved within the jitter buffer (described below in more detail), which fills up to a certain level. After this level is reached, the audio packets will then be played by telephony device 313 to the user through the speaker 821 or handset 818. It is generally understood within the design of such IP telephony incoming packet. There is some cushion in the jitter buffer, but when the audio packets are not replaced sufficiently, then the ability of the IP telephony device 313 to communicate the audio information to the user in real-time becomes jeopardized. This is described in further detail below. In step 1104, as these packets are run through a jitter buffer, a determination is made whether the number of packets buffered by the jitter buffer falls below a predetermined threshold, or level. If not, the process merely returns to step 1103. However, if the level of packets buffered by the jitter buffer falls below the predetermined threshold, or level, in step 1104, the process will proceed to step 1105 to send a congestion message to the process described below in FIG. 6A.

Note, the process of FIG. 4 is not limited to audio data, but can be utilized in any system where there is a need to increase the transfer rate of multimedia data between two network devices to overcome bursty transmissions of data in the network. Though the invention is helpful when there is a need to transmit the multimedia data in, or substantially in, real-time, the invention is applicable even when there is not a need for real-time transmissions.

Essentially, a data packet transmitting voice data contains 16 milliseconds (ms) of voice data. For there to be a real-time transmittal of voice communications no more than 16 ms can pass between received data packets. A jitter buffer is utilized to temporarily store received data packets. A jitter buffer generally will hold three data packets passing through the jitter buffer. Typically, up to a 48 ms delay is acceptable with audio communications before such a delay is discernable to the listener. The jitter buffer can be used to monitor whether the congestion on the network has increased to such an extent that unacceptable delays in the receipt of voice data packets is perceived. A jitter buffer will typically use a pointer that points to the buffer entry where the next data packet that is received is to be stored, while an out pointer points to the last jitter buffer. If the pointers become closer, this will indicate that congestion within the network is increasing. How close the pointers are can determine the predetermined threshold that is monitored in step 1104.

Specifically, the system of the present invention sends individual voice packets carrying 128 bytes, or 16 milliseconds, of speech; each packet arrives at 16 millisecond intervals or speech will be lost. Because latency and jitter over the Internet can far exceed 16 milliseconds, jitter buffers are used to store a number of packets before starting to play them. For example, if the worst-case jitter over the Internet is deemed to be 200 milliseconds, the jitter buffer logic would store 13 voice packets before starting to play the first one. This way, there are stored voice packets to make up for the periods when voice packets arrive late. In addition, there must be a way to replenish the "borrowed" packets from the jitter buffer as packets arrive late. There are a number of industry standard approaches to this including Voice Activity Detection and replaying the last packet over and over again until the buffer is replenished.

Figure 7:
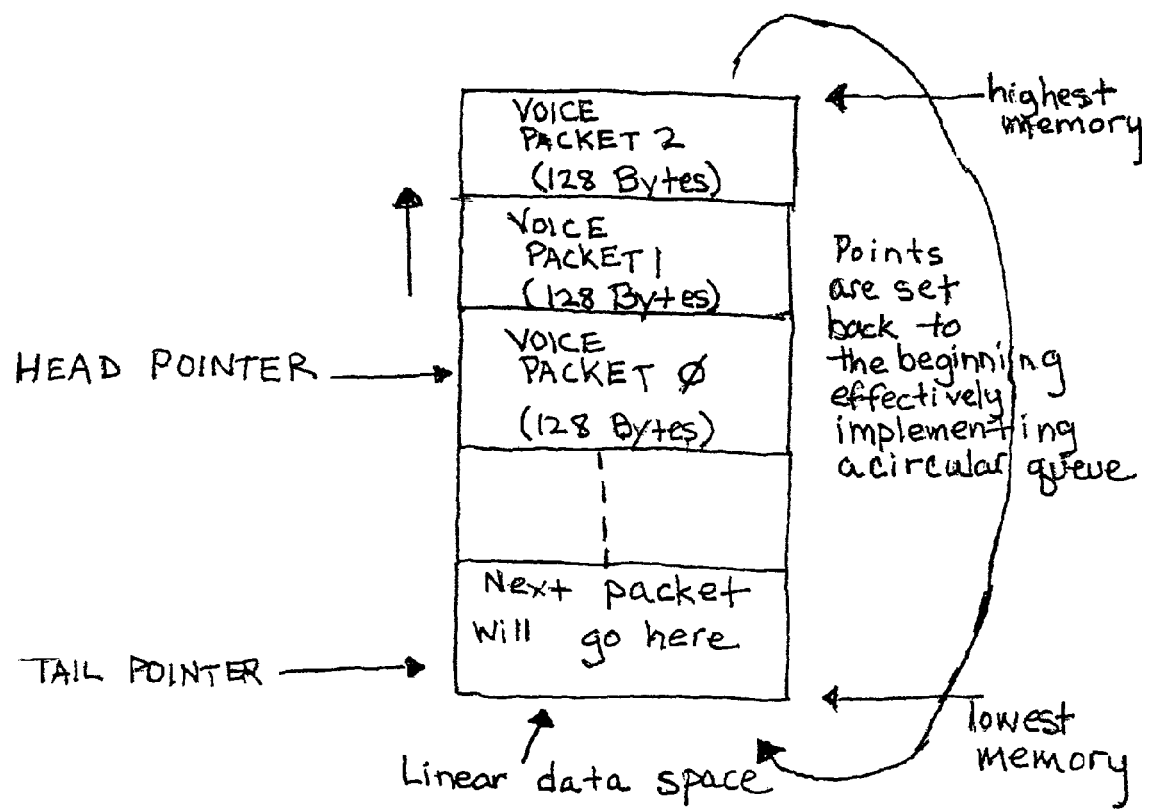
FIG. 7 illustrates operation of a jitter buffer.

Referring to FIG. 7, the system of the present invention implements the jitter buffers in software. As packets arrive, they are placed in the jitter buffer where the "tail pointer" currently points. The tail pointer is then incremented to point to the next element. If the end of the linear buffer is reached, the tail pointer is modified to point to the top of the buffer, effectively creating a circular queue. Conversely, the system plays the voice packets from the position pointed to by the "head pointer" and increments and wraps the pointer in the same fashion as the tail pointer. Software can decide how many packets to store before starting to play or how long to repeat the current packet while received packets are being buffered. Note that when the buffer is empty, both the head and tail pointers point to the same location. Similarly, when the jitter buffer is full, care must be taken to avoid incrementing the pointers beyond the end, effectively simulating an empty condition.

Figure 5:
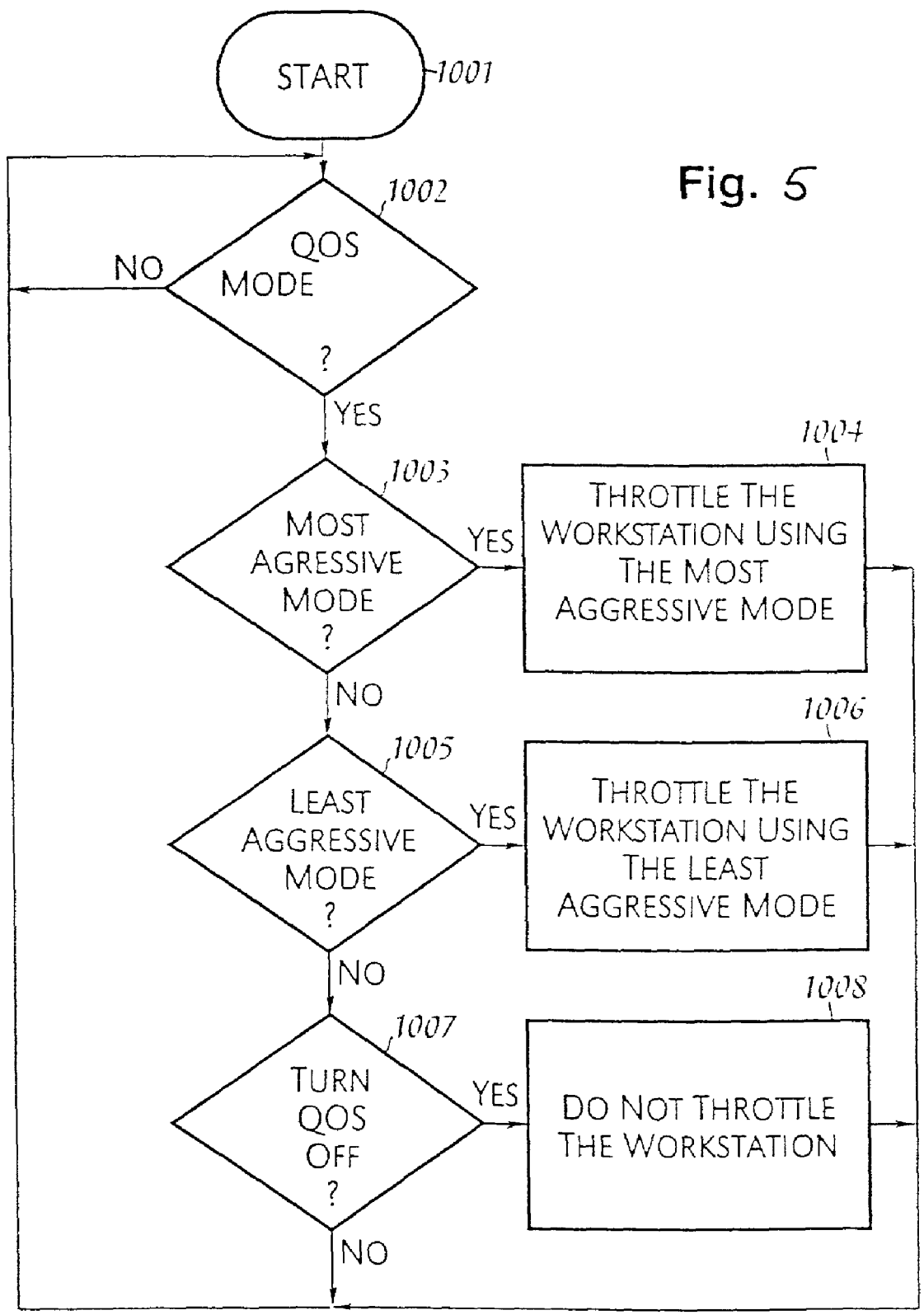
Figure 6A:
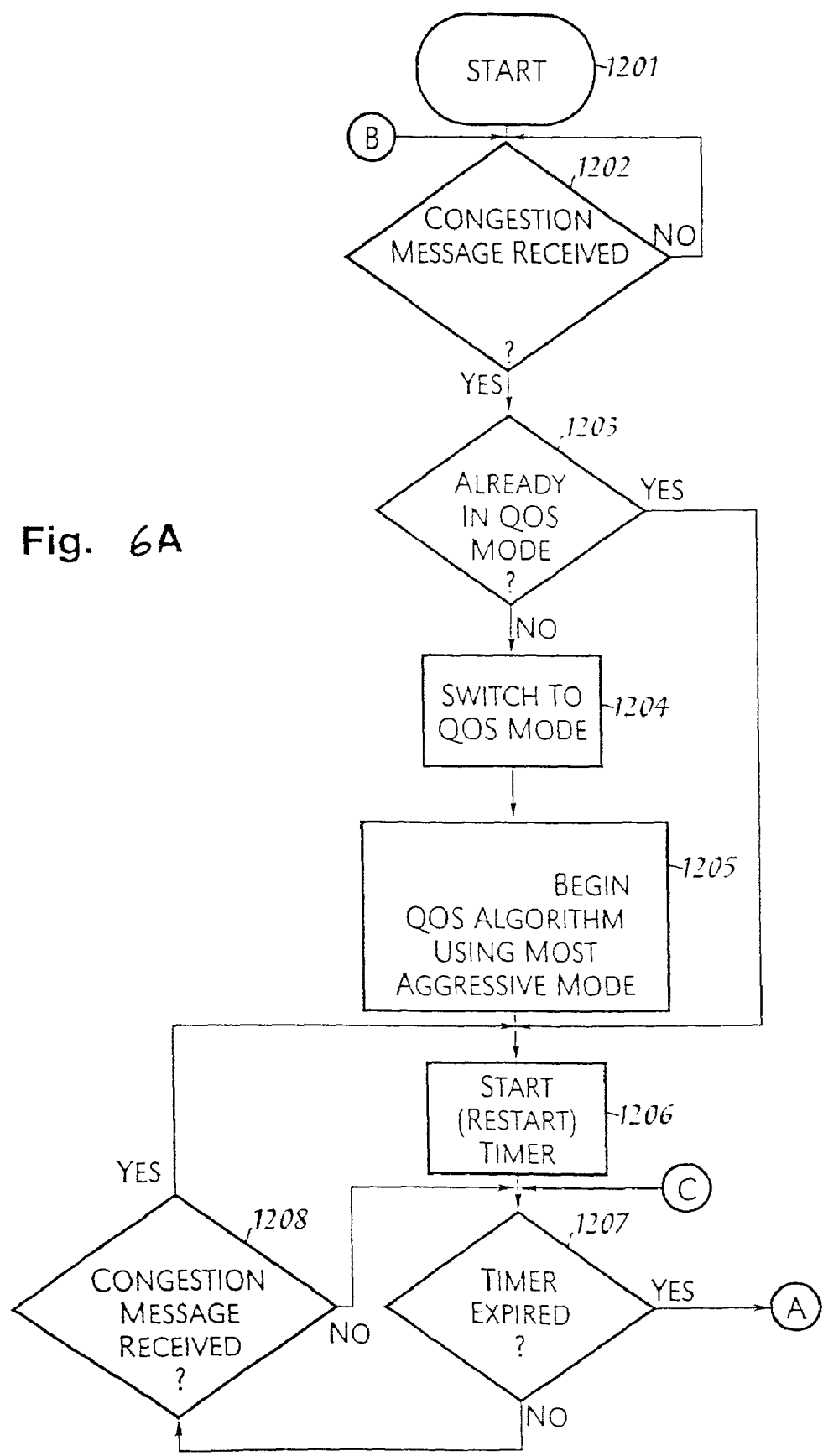
Figure 6B:
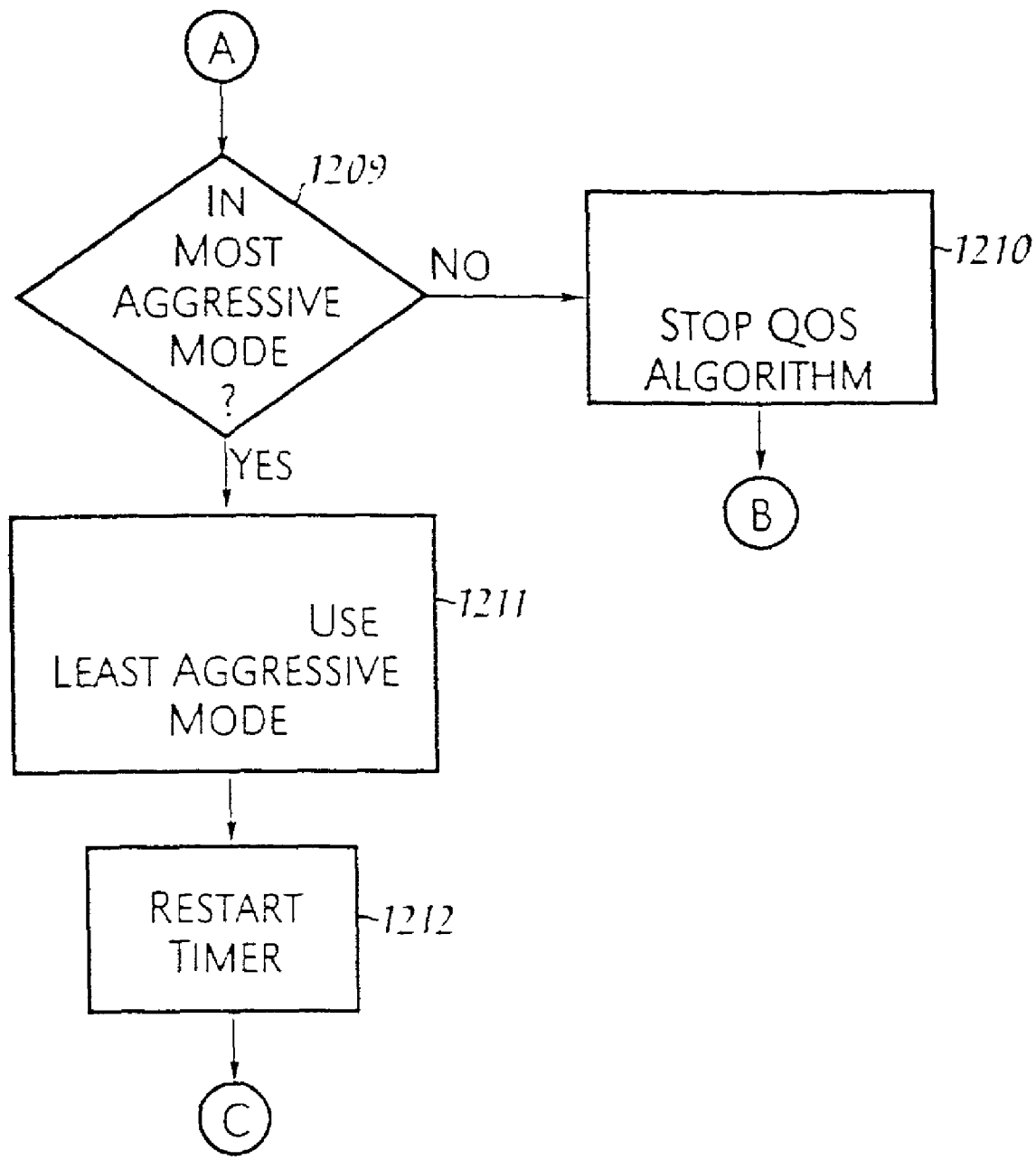

Referring next to FIGS. 6A and 6B, a flow diagram is illustrated that is implemented within IP telephone 313 (in DSP 801) upon receipt of a congestion message from the process of FIG. 4. The process begins in step 1201, and proceeds to step 1202 to determine whether a congestion message has been received from the process of FIG. 4. If yes, the process proceeds to step 1203 to determine whether the IP telephone 313 is already in a quality of service (QOS) mode. If yes, the process will move forward to step 1206. If not, the process will proceed to step 1204 to switch to QOS mode. Thereafter, in step 1205, a process in DSP 801 will commence to begin a QOS algorithm using a Most Aggressive Mode. Such a QOS algorithm is further described below with respect to FIG. 5. Thereafter, in step 1206, a timer is started, or restarted if the timer has previously begun and is still running. In step 1207, a determination is made whether the timer has expired. If not, the process will proceed to step 1208 to determine whether another congestion message has been received from the process of FIG. 4. If not, the process merely returns to step 1207. However, if another congestion message has been received, the process will return to step 1206 to restart the timer.

If in step 1207, the timer has expired, the process will proceed to step 1209, where a determination is made whether the QOS mode is in the Most Aggressive Mode. If yes, the process will proceed to step 1211 for the IP telephone 313 to use a Least Aggressive Mode, which is further described below with respect to FIG. 5. Thereafter, in step 1212, the previously noted timer will be restarted and the process will return to step 1207. If in step 1209, the QOS mode is not in the Most Aggressive Mode, then in step 1210, the IP telephone 313 will stop the QOS algorithm described below with respect to FIG. 5. And the process will return to step 1202.

Referring now to FIG. 5, there is illustrated another process run within the IP telephone 313. The process begins in step 1001 and proceeds to step 1002 where a determination is made whether the IP telephone 313 is in one of the aforementioned QOS modes. If yes, the process proceeds to step 1003 to determine whether the IP telephone 313 is in a Most Aggressive Mode. If yes, the process will then proceed to step 1004 to throttle the workstation 106 using the Most Aggressive Mode. The process then returns to step 1002. If in step 1003 it is determined that the IP telephone 313 is not in a Most Aggressive Mode, the process proceeds to step 1005 to determine if the IP telephone device 313 is to enter into a least aggressive mode. If yes, the process proceeds to step 1006 to throttle the workstation 106 using the Least Aggressive Mode. If in step 1005 the IP telephone 313 is not either to enter into the Most Aggressive Mode or the Least Aggressive Mode, then a determination is made whether the IP telephone 313 is to turn off the QOS Mode. If yes, then in step 1008, the IP telephone device 313 discontinues throttling data to and from the workstation 312.

Essentially, the process illustrated in FIG. 5 has the IP telephony device 313 beginning a hold-off procedure with the workstation 312. The level of aggressiveness, whether it is the Most Aggressive Mode or the Least Aggressive Mode can be thought of as a duty cycle whereby the device blocks data from the workstation 312 for a percentage of the time.

The throttling can be performed using many different methods. One method would be for the telephony device 313 to flood the connection to the workstation 312 with idle patterns (jabber). The various levels of flow control needed could be achieved by a jabber duty cycle. The Most Aggressive Mode may have an eighty percent duty cycle while the Least Aggressive Mode may have a twenty percent duty cycle. During the jabber process, communication between the workstation 312 and the network 102 is disrupted, allowing more bandwidth for the voice packets between the telephony device 313 and the network 102.

"Jabbering" is a standard network process. In local area networking technology, to jabber is to continuously send random data (garbage). This locks up the network with the incessant transmission of the garbage. In a network, any node can transmit at any time. If more than one node happens to transmit at the same time, both nodes will notice that a collision has occurred, hold off for some amount of time, then re-transmit. If a collision is detected again, the process continues until the data is delivered. Jabbering is the process of flooding the network with collisions in such a way that no data can actually be transmitted due to the number of collisions. Since the connection between the IP telephony device 313 and workstation 312 is a separate network, the jabbering by the IP telephony device 313 merely stops data from flowing between the IP telephony device 313 and the workstation 312. The network on the other side of the IP telephony device 313 is unaffected because it is in a different "collision domain."

The workstation 312 cannot then transmit data because the jabbering is present. Each side will try to send data to the other side, but every time they try, they will fail because of the jabbering. The source of the jabbering signal is not important. Jabbering can be explained in a hardware fashion as follows. When one and only one station is transmitting, the voltage on the wire is a certain voltage as specified by the IEEE 802.3 Specification. If two stations start to transmit, the voltage is double so any station listening is capable of detecting the collision. When the voltage goes to zero because the offenders are holding off, it is now safe to try again. Jabbering can be thought of as a station placing a static voltage level on the wire between the workstation 312 and the IP telephone device 313 sufficiently high as to be detected as a collision. Neither the IP telephone 313 or the workstation 312 will attempt to transmit to each other until this voltage level goes away.

The present invention permits the IP telephony device 313 from stopping the workstation 312 from sending data by causing so many collisions that none of the data can make it through. Essentially, data transmission between the IP telephony device 313 and the workstation 312 is frozen. The IP telephony device 313 will perform this jabbering process in bursts. When the collisions stop, the data the workstation 312 was trying to send will then be passed on to the network through the IP telephony device 313. Also, if the IP telephony device 313 was trying to send something from the network to the workstation 312, that side is frozen as well. These collision bursts are generally short enough that the protocol does not time out, but long enough to throttle the data flow. The duty cycle of the collision bursts may be proportional to the amount of data allowed to flow (i.e., if the duty cycle is 80/20, eighty percent of the time data is blocked).

A duty cycle may be used since jabbering cannot continue forever because the underlying protocols such as TCP/IP or NOVELL and the workstation 312 will eventually time out and give up on the data it is trying to send. The duty cycle allows data to flow often enough so that the effective throughput is reduced while allowing the protocols to survive.

Although the present invention and its advantages have been described in detail, it should be understood that various changes, substitutions and alterations can be made herein without departing from the spirit and scope of the invention as defined by the appended claims.

What is claimed is:

1. An information handling system comprising:
a modem;
a first telephony device coupled to the modem; and
a first network device coupled to the modem through the first telephony device, wherein the first telephony device includes first circuitry for throttling data sent from the first network device.

2. An information handling system comprising:
a modem;
a first telephony device coupled to the modem;
a first network device coupled to the modem through the first telephony device, wherein the first telephony device includes first circuitry for throttling data sent from the first network device;
a router coupled between the first telephony device and the modem; and
a second network device coupled to the router through a second telephony device, wherein the second telephony device includes second circuitry for throttling data sent from the second network device.

3. The system as recited in claim 2, wherein the router, modem, first telephony device, and first network device are coupled to each other via a network.

4. The system as recited in claim 1, wherein the network is a TCP/IP network.

5. The system as recited in claim 4, wherein the network is a packet switched network.

6. The system as recited in claim 1, wherein the first telephony device communicates using an IP protocol.

7. The system as recited in claim 1, wherein the first throttling circuitry reduces a future amount of data from being transferred from the first network device if the amount of data exceeds a predetermined threshold.

8. The system as recited in claim 1, wherein the first telephony device includes circuitry for monitoring an amount of data addressed to and received by the first telephony device, wherein the first throttling circuitry reduces a future amount of data from being transferred from the first network device if the amount of data addressed to and received by the first telephony device falls below a predetermined threshold.

9. The system as recited in claim 8, wherein the monitoring circuitry comprises a jitter buffer where the predetermined threshold is a predetermined level within the jitter buffer.

10. The system as recited in claim 8, wherein the first throttling circuitry has a plurality of throttling levels.

11. The system as recited in claim 8, wherein the first throttling circuitry includes a mode level in which the first throttling circuitry should operate.

12. The system as recited in claim 11, wherein the first throttling circuitry adjusts its level of throttling of the data in response to the mode level.

13. An information handling system comprising:
a modem;
a first telephony device coupled to the modem; and
a first network device coupled to the modem through the first telephony device, wherein the first telephony device includes first circuitry for throttling data sent from the first network device, wherein the first telephony device includes circuitry for monitoring an amount of data addressed to and received by the first telephony device, wherein the first throttling circuitry reduces a future amount of data from being transferred from the first network device if the amount of data addressed to and received by the first telephony device falls below a predetermined threshold, wherein the first throttling circuitry includes a mode level in which the first throttling circuitry should operate, wherein the first throttling circuitry adjusts its level of throttling of the data in response to the mode level, wherein the mode level is a most aggressive mode, wherein the first throttling circuitry will throttle the future amount of data sent from the first network device at a highest level in response to the mode level being in the most aggressive mode.

14. The system as recited in claim 1, wherein the data sent from the first network device is sufficiently throttled so that the first telephony device can communicate real-time multimedia signals to and from the modem.

15. The system as recited in claim 1, wherein the modem is operable for coupling to a wide area network.

16. In an information handling system comprising a modem, a telephone coupled to the modem, and a workstation coupled to the modem through the telephone, a method comprising the steps of:
transferring data from the workstation to the telephone, wherein the data sent from the workstation is addressed for transmission to a network via the modem;
communicating audio information between the telephone and the network; and
sufficiently throttling the data sent from the workstation to the telephone to increase a rate of transfer of the audio information during the communicating step.

17. The method as recited in claim 16, wherein the network is a TCP/IP network.

18. The method as recited in claim 16, wherein the network is a packet switched network.

19. The method as recited in claim 16, wherein the throttling step further comprises the step of reducing a future amount of data from being transferred from the workstation if the amount of data exceeds a predetermined threshold.

20. The method as recited in claim 16, wherein the throttling step further comprises the step of monitoring an amount of the audio information being received by the telephone.

21. The method as recited in claim 20, wherein the monitoring step further comprises the step of monitoring a predetermined level within a jitter buffer.

22. In an information handling system comprising a telephony device coupled between a network device and a modem, wherein the modem is coupled to a wide area network, a method comprising the steps of:
transferring data from the network device to the telephony device where the data is addressed for transmission through the telephony device to the wide area network via the modem;
communicating multimedia information between the telephony device and the wide area network; and
sufficiently throttling the data from the network device to the telephone device to increase available bandwidth for communication of the multimedia information between the telephony device and the wide area network.

23. The method as recited in claim 22, wherein the throttling step reduces a future amount of data from being transferred from the network device to the telephony device if an amount of data being transferred from the network device exceeds a predetermined threshold.

24. The method as recited in claim 23, wherein the throttling step monitors a jitter buffer level to determine if the amount of data being transferred from the network device exceeds the predetermined threshold.

25. The method as recited in claim 23, wherein the network device is a workstation and the telephony device is a digital telephone.

26. The method as recited in claim 23, wherein the telephony device is an IP telephone with level 2 switching circuitry.

27. The method as recited in claim 26, wherein the network device is a workstation.

28. The method as recited in claim 27, wherein the modem communicates the data and the multimedia information to the wide area network.

29. The method as recited in claim 28, wherein a router is coupled between the modem and telephony device.

30. A telephony device comprising:
  an input data port for receiving data, wherein the data is addressed for transmission to a location other than the telephony device through an output port on the telephony device;
  circuitry for communicating information to and from the telephony device;
  a jitter buffer; and
  circuitry for sufficiently throttling the data in response to a predetermined level being exceeded within the jitter buffer so that the communication of the information is performed in real-time.

31. The telephony device as recited in claim 30, wherein the jitter buffer temporarily stores the information.

32. The telephony device as recited in claim 30, further comprising:
  level 2 switching circuitry for handling the information and data.

33. The telephony device as recited in claim 30, wherein the data and the information are communicated using IP protocol.

34. The telephony device as recited in claim 30, wherein the predetermined level in the jitter buffer is an amount of the information temporarily stored in the jitter buffer.

35. A system comprising:
  a wide area network ("WAN");
  a first modem for coupling to the WAN;
  a first IP telephone coupled to the first modem;
  a first network device coupled to the first modem via the first IP telephone so that data communicated between the first network device and the first modem is switched through the first IP telephone; and
  a second IP telephone coupled to the WAN,
  wherein the first IP telephone includes circuitry for throttling the data communicated between the first network device and the first modem so as to increase a bandwidth in a connection coupling the first IP telephone to the first modem.

36. The system as recited in claim 35, wherein multimedia information communicated between the WAN and the first IP telephone and the data travel over the connection coupling the first IP telephone to the first modem.

37. The system as recited in claim 36, wherein the multimedia information and the data occupy the same bandwidth between the first IP telephone and the first modem.

38. The system as recited in claim 35, further comprising:
  a router coupling the first IP telephone to the first modem.

39. The system as recited in claim 38, further comprising:
  a third IP telephone coupled to the router;
  a second network device coupled to the first modem via the third IP telephone so that data communicated between the second network device and the first modem is switched through the third IP telephone,
  wherein the third IP telephone includes circuitry for throttling the data communicated between the second network device and the first modem so as to increase a bandwidth in a connection coupling the third IP telephone to the first modem.

40. The system as recited in claim 37, wherein the multimedia information is communicated over the WAN between the first and second IP telephones.

41. The system as recited in claim 35, further comprising:
  a second modem for coupling to the WAN, wherein the second IP telephone is coupled to the second modem; and
  a second network device coupled to the second modem via the second IP telephone so that data communicated between the second network device and the second modem is switched through the second IP telephone,
  wherein the second IP telephone includes circuitry for throttling the data communicated between the second network device and the second modem so as to increase a bandwidth in a connection coupling the second IP telephone to the second modem.

42. The system as recited in claim 35, further comprising:
  a router coupled to the WAN;
  a hub coupled to the router, wherein the second IP telephone is coupled to the router via the hub; and
  a second network device coupled to the hub via the second IP telephone,
  wherein the second IP telephone includes circuitry for throttling the data communicated between the second network device and the hub so as to increase a bandwidth in a connection coupling the second IP telephone to the hub.

43. The system as recited in claim 42, further comprising:
  a data server coupled to the hub, wherein the data is communicated between the second network device and the data server.

44. The system as recited in claim 43, wherein data is also communicated between the first network device and the data server over the WAN.

45. The system as recited in claim 42, further comprising:
  a multimedia server for communicating multimedia information between the second IP telephone and public switched telephone network.

46. The system as recited in claim 45, wherein multimedia information is also communicated between the first IP telephone and the public switched telephone network over the WAN and via the multimedia server.

47. The system as recited in claim 1, wherein the data is sent from the first network device to the modem.

48. The system as recited in claim 2, wherein the data sent from the first network device is sent to the modem, and wherein the data sent from the second network device is sent to the modem.

49. The system as recited in claim 13, wherein multimedia information is also communicated between the first IP telephone and the public switched telephone network over the WAN and via the multimedia server.

50. The system as recited in claim 1, wherein the modem is configured to be coupled to a network, wherein the first telephony device is coupled between the modem and the first network device.

51. The system as recited in claim 50, wherein the first network device is only coupled to the network via the modem.

52. The system as recited in claim 13, wherein the modem is configured to be coupled to a network, wherein the first telephony device is coupled between the modem and the first network device.

53. The system as recited in claim 13, wherein the first network device is only coupled to the network via the modem.

54. An information handling system comprising:
a modem;
an IP telephone comprising first and second data ports, wherein the first data port is coupled to the modem, the first and second data ports configured for transmitting and receiving digitized data; and
a computer workstation coupled to the second data port of the IP telephone, wherein the IP telephone transfers digitized data between the modem and the computer workstation, wherein the IP telephone includes circuitry for throttling digitized data sent from the computer workstation through the first and second data ports to the modem.

* * * * *